(12) United States Patent
Cha et al.

(10) Patent No.: US 6,486,933 B1
(45) Date of Patent: Nov. 26, 2002

(54) LIQUID CRYSTAL DISPLAY WITH PREVENTING VERTICAL CROSS-TALK HAVING OVERLAPPING DATA LINES

(75) Inventors: Ki-Seok Cha, Kyungki-do; Jung-Uk Shim, Seoul; Chang-Hun Lee, Kyungki-do; Joon-Hoo Choi, Seoul, all of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/266,897

(22) Filed: Mar. 12, 1999

(30) Foreign Application Priority Data

Mar. 12, 1998 (KR) .............................. 98-8213
Dec. 16, 1998 (KR) ............................ 98-55269

(51) Int. Cl.[7] ...................... G02F 1/1343; G02F 1/1333
(52) U.S. Cl. ................... 349/139; 349/141; 349/110
(58) Field of Search ............................. 349/141, 110, 349/139

(56) References Cited

U.S. PATENT DOCUMENTS

| | | | | |
|---|---|---|---|---|
| 5,978,059 A | * | 11/1999 | Ohta et al. ................... | 349/141 |
| 6,040,887 A | * | 3/2000 | Matsuyama et al. ........ | 349/141 |
| 6,064,451 A | * | 5/2000 | Oh et al. ...................... | 349/40 |
| 6,069,678 A | * | 5/2000 | Sakamoto et al. ........... | 349/141 |
| 6,091,473 A | * | 7/2000 | Hebiguchi ................... | 349/141 |
| 6,104,461 A | * | 8/2000 | Zhang et al. ................ | 349/122 |
| 6,108,066 A | * | 8/2000 | Yanagawa et al. .......... | 349/141 |
| 6,177,970 B1 | * | 2/2001 | Kim ............................ | 349/43 |

* cited by examiner

Primary Examiner—Kenneth Parker
Assistant Examiner—Mike Qi
(74) Attorney, Agent, or Firm—McGuireWoods LLP

(57) ABSTRACT

A liquid crystal displays and a method of production in which a plurality of data lines are formed on an insulating substrate with a plurality of gate lines formed on the insulating substrate and arranged perpendicular to the data lines and are located at opposite sides with respect to the data lines. The first and the second common electrode lines are arranged parallel to the gate lines and divided into a plurality of bars which are located at opposite sides with respect to the data lines. A plurality of common electrodes are formed parallel to the data lines and connected to the first and the second common electrode lines. An insulating film covers the gate lines, the data lines, the first and second common electrode lines and the common electrodes. A secondary common electrode is formed on the insulating film and arranged parallel to the data lines. Moreover, the secondary common electrode overlaps edges of the data line to play a role as an electric field blocking webbing and contacts the common electrode lines located at opposite sides with respect to the data line through contact holes. A contact pattern is formed on the insulating film and connects the two gate lines located at opposite sides with respect to the data line through contact holes.

4 Claims, 14 Drawing Sheets

LIQUID CRYSTAL DISPLAY WITH PREVENTING VERTICAL CROSS-TALK HAVING OVERLAPPING DATA LINES

BACKGROUND OF THE INVENTION (a) Field of the Invention

The present invention relates to liquid crystal displays (LCDs) and a manufacturing method thereof, in particular, to structures of liquid crystal displays having pixel electrodes and common electrodes in a substrate and a manufacturing method thereof.

(b) Description of the Related Art

Generally, liquid crystal displays (LCDs) include two substrates facing each other and a liquid crystal layer injected between the substrates. Images of the LCD are displayed by controlling the light transmittance of the liquid crystal layer.

In an LCD mode having pixel electrodes and common electrodes in one substrate, an electric field is generated parallel to the surfaces of the substrates so that long axes of liquid crystal molecules are operated in parallel to the surfaces of the substrates. Therefore, a viewing angle becomes enhanced.

An LCD according to the conventional invention now will be described with reference to the accompanying drawings.

FIG. 1 is a layout view of an LCD according to the conventional invention. FIG. 2 is a cross sectional view of a thin film transistor taken along line II-II' in FIG. 1, and FIG. 3 is a cross sectional view taken along line III-III' in FIG. 1.

As shown in FIG. 1 to FIG. 3, gate lines 200 are formed on a substrate 100 and arranged in the horizontal direction. The first common electrode line 301 and the second common electrode lines 302 are formed parallel to the gate lines 200. A plurality of common electrodes 310 are arranged in the vertical direction in FIG. 1, extend from the first common electrode line 301 and connect to the second common electrode line 302.

A gate insulating film 400 covers the gate line 200, the first and the second electrode lines 301 and 302, and the common electrodes 310. An amorphous silicon layer 500 is formed on the gate insulating film 400 and overlaps a portion of the gate line 200 playing a role as the gate electrode. Data lines 700 are formed on the gate insulating film 400 and arranged in the vertical direction in FIG. 1. A source electrode 710 is extended from the date line 700 and partially overlaps the amorphous silicon layer 500, and a drain electrode 720 is formed opposite the source electrode 710 and partially overlaps the amorphous silicon layer 500. Doped amorphous silicon layers 610 and 620 are formed between the amorphous silicon layer 500 and the source 710 and the drain electrodes 720 to improve contact characteristics.

A pixel electrode line 800 is extended from the drain electrode 720 and overlaps the first common electrode line 301. A plurality of pixel electrodes 810 is extended from the pixel electrode line 800 and arranged parallel to the data line 700 and the common electrodes 310. Each the pixel electrode 810 is located between the two common electrodes 310.

As described above, since the pixel electrode 810 and the common electrodes 310 are formed in the same substrate 100 and parallel to each other, an generated electric field is substantially parallel to the surface of the substrate 100. The electric field and an arrangement of the liquid crystal in the LCD according to the conventional invention now will be described hereinafter.

FIG. 4 is a cross sectional view showing the electric field and the arrangement of the liquid crystal molecules.

As shown in FIG. 4, a common electrode 310 is formed on the first substrate 100 for a thin film transistor substrate and arranged parallel to a pixel electrode 810 and a data line 700 via a gate insulating film 400. The second substrate 110 having a light-blocking film 120 corresponds to face the first substrate 100 and a liquid crystal layer (LC) is interposed therebetween. The light-blocking film 120 is located between two pixels, and arranged to face the data line 700 and a portion of the common electrode 310 adjoining the data line 700

The liquid crystal layer (LC) of the above-described LCD is operated by a potential difference between the common electrode 310 and the pixel electrode 810. In more detail, either a direct-current (DC) voltage or an alternating-current (AC) is applied to the common electrode 310. Display signals are applied to the pixel electrode 810 through the data line 700 when the thin film transistor (TFT) is in the on-state. If the TFT gets turned off, the signals applied to the pixel electrode 810 are stored until the TFT gets turned on again.

As illustrated in FIG. 4, electric field lines E perpendicular to equipotential lines $P_{eq}$ are substantially parallel to the surface of the substrates 100 and 110 between the electrodes 310 and 810. However, an abnormal arrangement of the liquid crystal molecules occurs between the common electrode 310 adjoining to the data line 700 and the pixel electrode 810. This phenomenon of an unwanted abnormal arrangement is defined as a disclination. One cause of the disclination is the electric voltage differences between the voltages applied and stored to the pixel electrode 810 and voltages applied to the data line 700. As the electric voltage difference between the data line 700 and the pixel electrode 810 is increased and the distance between the data line 700 and the pixel electrode 810 is narrowed, the disclination region of the liquid crystal layer LC becomes wider. A signal variation of the data line 700 is another cause of the disclination. That is, since the adjoining common electrode 310 is affected by the signal variation, the status of the electric field is changed.

In the disclination region, light-leakage may occur. That is, light tansmitted by the disclination region is partially blocked by the blocking film 120 overlapping the data line 700 and a part of the adjoining common electrode 310. However, as shown in FIG. 4, if the disclination region is wide, the light-leakage still occurs through a region A which is not blocked by the blocking film 120.

Additionally, even when light passing through the disclination region is initially blocked by the light-blocking film 120, it is possible that light-leakage still occurs around the light-blocking film 120. This is because reflection of light occurs at the surface of the blocking film 120 which is made of metals such as Cr and then reflects again off of the common electrode 310 or the pixel electrode 810.

Since this light-leakage phenomenon occurs at pixels along the data lines 700, a vertical cross-talk effect by which a white line is generated in a normally black state display screen occurs.

One method to prevent the vertical cross-talk is overlapping a common electrode and the adjoining data line. However, since a parasitic capacitance occurs near the overlapping portion of the data line and the common electrode, the driving IC may be abnormally heated while being operated. Another method to prevent the cross-talk is forming the light-blocking film from an organic film. However, as this would require a different method of recognizing alignment keys, extra equipment investment will be needed.

SUMMARY OF THE INVENTION

The present invention has been made in an effort to solve the above problems.

It is an object of the present invention to reduce the disclination region of liquid crystal layer to decrease crosstalk.

It is another object of the present invention to prevent the cross-talk without generation of heat in driving circuits or an increase of the manufacturing cost due to an equipment investment.

To achieve the above objects, a liquid crystal display according to an embodiment of the present invention provides a field-blocking film which overlaps edges of a data line via an insulating film and blocks an electric field generated from the data line.

The field-blocking webbing may be made by partially overlapping a common electrode adjoining to the data line and connect to the common electrode.

Gate lines may be formed on the same layer as the data line. The gate line is divided into a plurality of portions, which are separated from the data lines. The portions are connected to each other by connect patterns formed on an insulating film covering the gate lines and the data lines. Moreover, the common electrodes may be formed on the same layer as the data line. In this case, the common electrodes of two adjacent pixels connect to each other by the electric field blocking webbing which is formed on the insulating film and overlaps the data line and the common electrode.

In this embodiment, switching devices may be included. The switching devices play a role of transmitting image signals from the data lines to the pixel electrodes according to scan signals from the gate lines.

To achieve above objects, in a liquid crystal display according to another embodiment of the present invention, data lines are located on a lower layer than common electrodes and do not overlap the common electrodes. In other words, data lines are formed on a lower substrate in one direction and a gate insulating film covers the data lines. On the gate insulating film, gate lines are formed perpendicular to the data lines, common electrode lines are formed parallel to the gate lines, and a plurality of common electrodes are extended from the common electrode line. The common electrodes are arranged parallel to the data lines. A light-blocking film is formed on one surface of an upper substrate facing the lower substrate. The light-blocking film overlaps the data line and a part of the common electrode adjoining to the data line.

It is required that the common electrode adjoining the data line does not overlap the data line.

Secondary data lines may be formed on an interlayer insulating film covering the common electrodes and electrically connect to the data lines. The secondary data lines are required not to overlap the common electrodes.

In the case that the data line is formed below the common electrode, since directions of light transmitting through the gap between the data line and the common electrode are different from in the conventional structure, the light is mostly blocked by the light-blocking film. In addition, since an incident angle of the light is large, the intensity of the light is decreased while being reflected several times on the light-blocking film and the common electrodes.

BRIEF DESCRIPTION OF THE DRAWINGS

Further objects and other advantages of the present invention will become apparent from the following description in conjunction with the attached drawings, in which.

DETAILED DESCRIPTION OF THE PREFERRED EMBODIMENTS

Figure 1:
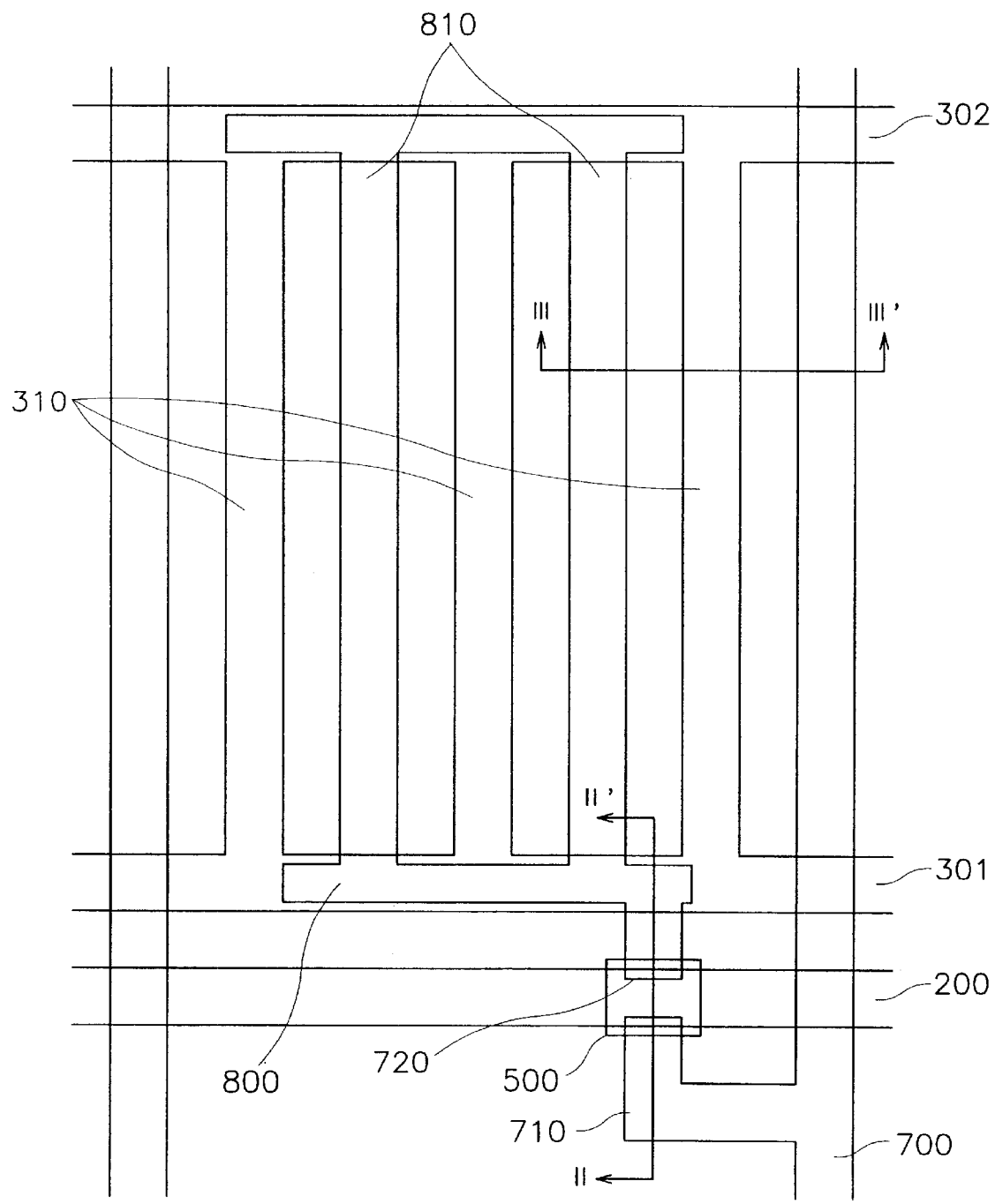
FIG. 1 is a layout view of an liquid crystal display (LCD) according to a conventional invention.
Figure 2:
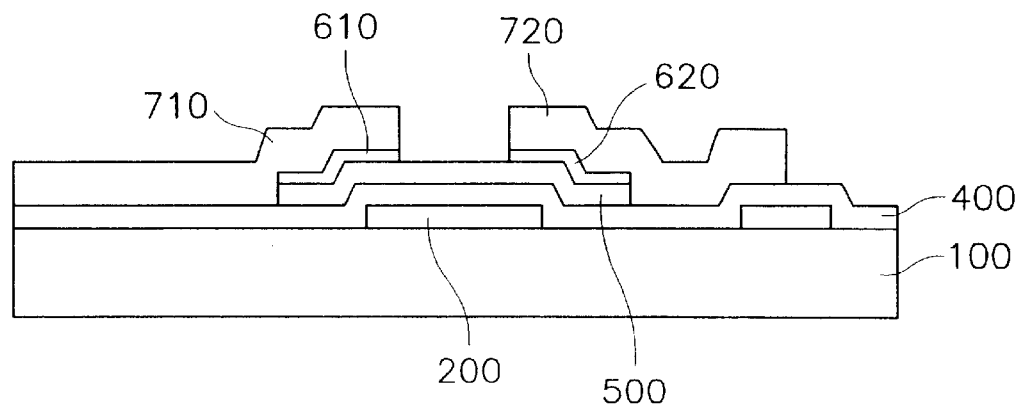
FIG. 2 is a cross-sectional view of a thin film transistor taken along line II-II' in FIG. 1.
Figure 3:
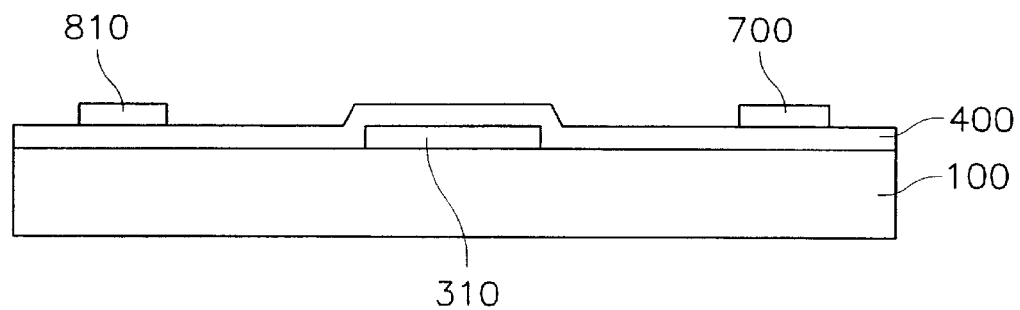
FIG. 3 is a cross-sectional view taken along line III-III' in FIG. 1.
Figure 4:
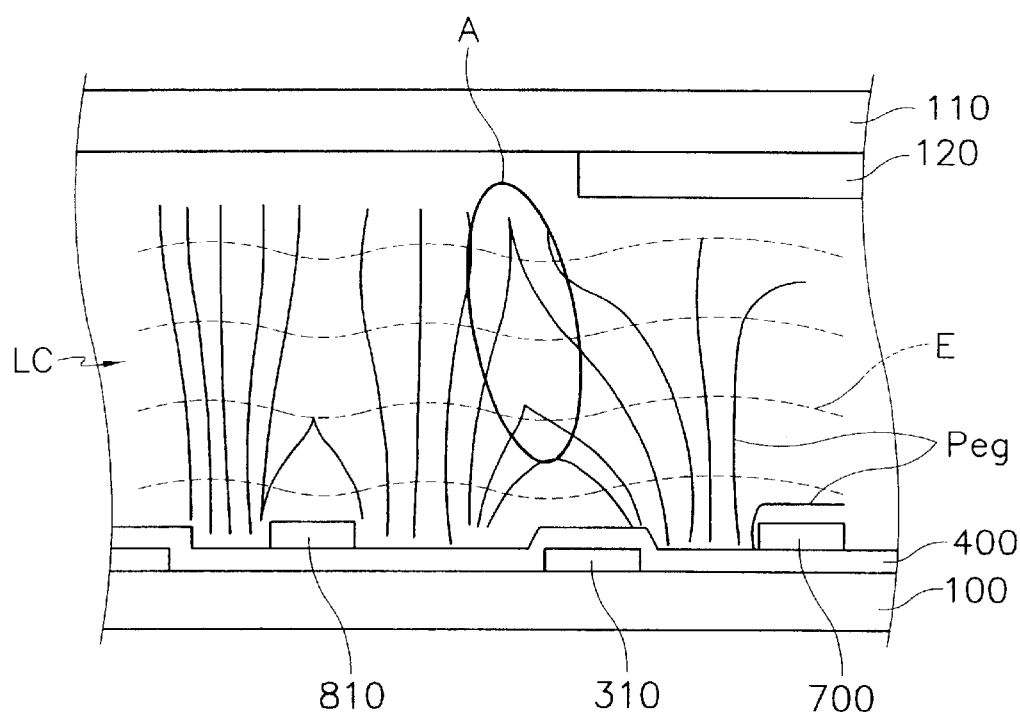
FIG. 4 is a cross-sectional view showing an electric field distribution and an arrangement of liquid crystal molecules according to an LCD of the conventional invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these inventions are provided so that this disclosure will be thorough and complete, and will fully convey the scope of the invention to those skilled in the art. In the drawings, the thickness of layers and regions are exaggerated for clarity. Like numbers refer to like elements throughout. It will be understood that when an element such as a layer, region or substrate is referred to as being "on" another element, it can be directly on the other element or intervening elements may also be present.

Liquid crystal displays (LCDs) and a manufacturing method thereof now will be described hereinafter.

Figure 5:
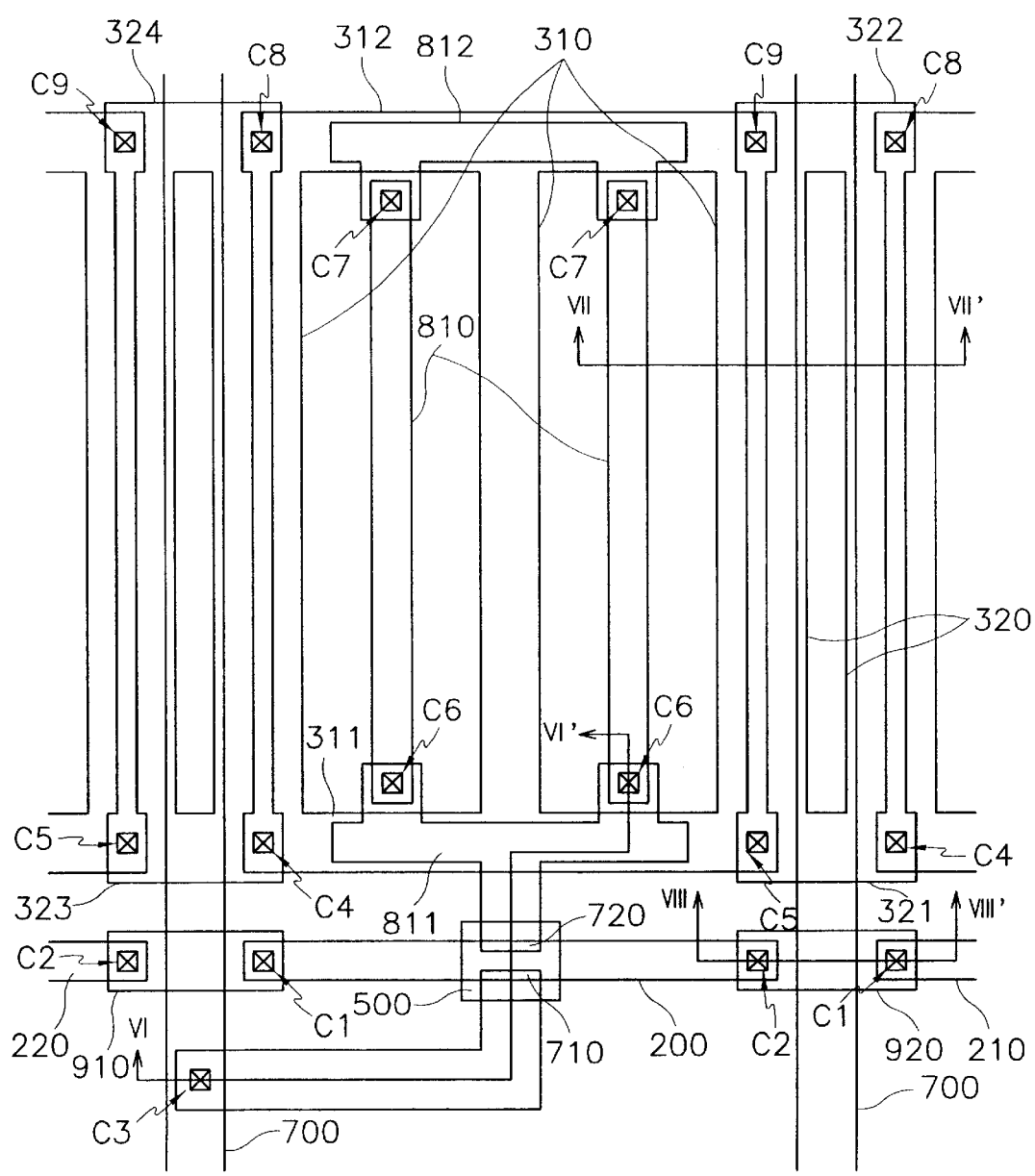
FIG. 5 is a layout view of an LCD according to the first embodiment of the present invention.
Figure 6:
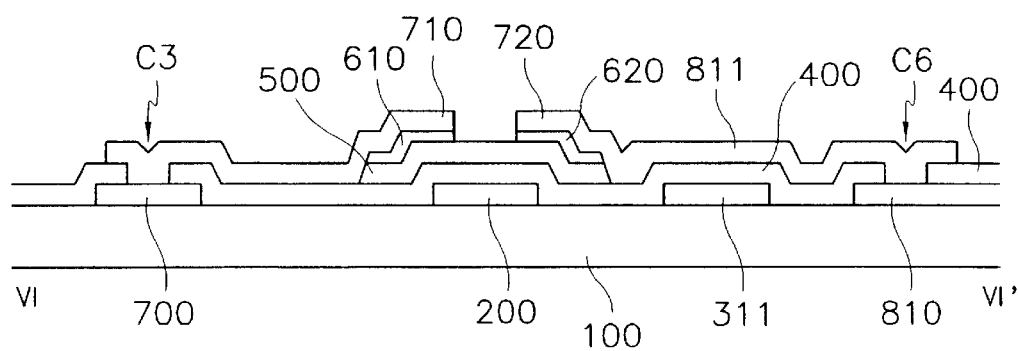
FIGS. 6 to 8 are cross-sectional views taken along lines VI-VI', VII-VII' and VIII-VIII'.
Figure 7:
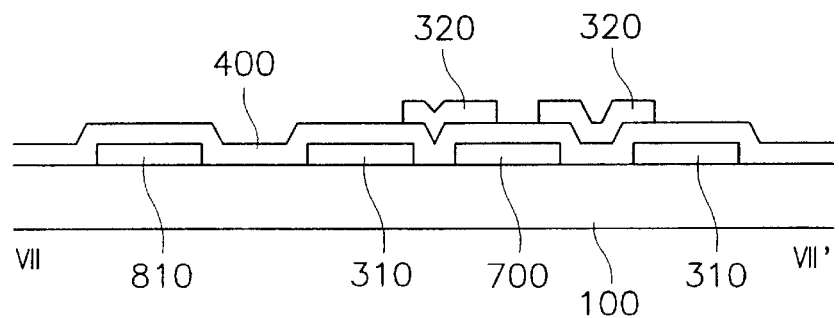
Figure 8:
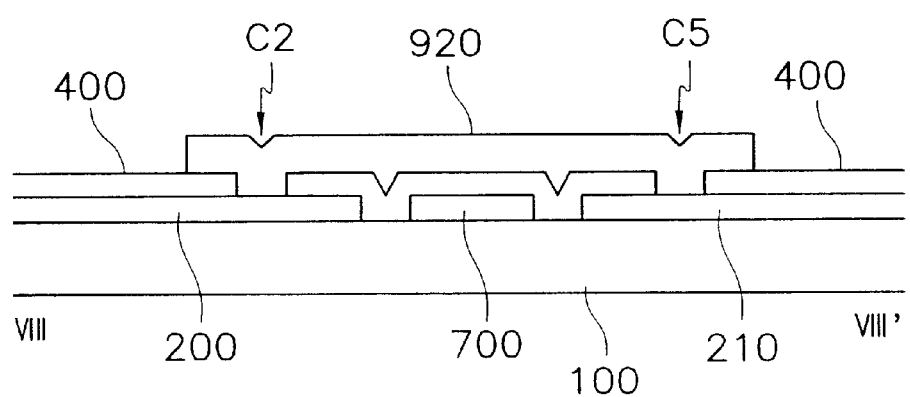

FIG. 5 is a layout view of a thin film transistor substrate for an LCD according to the first embodiment of the present invention, and FIGS. 6 to 8 are cross-sectional views respectively taken along lines VI-VI', VII-VII' and VIII-VIII' in FIG. 5. In the first embodiment, data lines and gate lines, common electrodes and pixel electrodes are formed in the same layer, and secondary common electrodes are arranged along the edges of the data lines.

As shown in FIGS. 5 to 8, a plurality of data lines 700 are formed on an insulating substrate 100 and arranged in the vertical direction. A plurality of gate line bars 200, 210, and 220 are formed on the same layer as the data lines 700 and arranged in the horizontal direction. Each bar is located between the two data lines 700 and separated from the data line 700.

A plurality of the first common electrode line bars 311 are formed on the same layer as the gate line bars 200, 210, and 220 and arranged parallel to the gate line bars 200, 210, and 220. Each the first common electrode line bar 311 is located between the two date lines 700 and separated from the data line 700.

A plurality of common electrodes 310 are extended from the common electrode line bar 311 and arranged parallel to the data line 700. The extended ends of the common electrodes 310 are connected to the second common electrode line bar 312 which is arranged parallel to the first common electrode line bar 311.

A plurality of pixel electrodes 810 are formed on the same layer as the data lines 700, the first and the second common electrode line bars 311 and 312, and the gate lines 310. Each pixel electrode 810 is located between the two common electrode 310, parallel to the data lines 700 and the common electrodes 310, and separated from the first and the second common electrode line bars 311 and 312.

A gate insulating film 400 covers the gate line bars 220, 210, and 220, the common electrode line bars 311 and 312, the data lines 700 and the pixel electrodes 810. Contact holes C1 and C2 exposing both ends of the gate line bars 200, 210 and 220, a contact hole C3 exposing a portion of the data line 700, contact holes C4 and C5 exposing the first common electrode line bars 311, contact holes C6 and C7 exposing both ends of the pixel electrodes 810 and contact holes C8 and C9 exposing both ends of the second common electrode line bars 312 are formed in the gate insulating film 400.

An amorphous silicon layer 500 is formed on the gate insulating film 400 and overlaps a gate electrode, a portion of the gate line bar 200.

Conductive connect patterns 910 and 920 are formed on the gate insulating film 400 and intersect the data lines 700. The connect patterns 910 and 920 connect the two adjacent gate line bars 200, 210, and 220 to each other through the contact holes C1 and C2. As a result, all the gate lines bars 200, 210 and 220 are electrically connected to each other and the connected bars play a role as a gate line.

Furthermore, a source electrode 710 and a drain electrode 720 are formed on the gate insulating film 400 and made of the same material as the connect patterns 910 and 920. One end of the source electrode 710 is connected to the data line 700 through the contact hole C3, the other end of the source electrode 710 overlaps the edge of the amorphous silicon layer 500. The drain electrode 720 is located opposite the source electrode 710 and overlaps the amorphous silicon layer 500. Doped amorphous silicon layers 610 and 620 for improving contact characteristics are formed between the amorphous silicon layer 500 and the source and the drain electrodes 710 and 720.

The first pixel electrode line 811 is extended from the drain electrode 720 and overlaps the first common electrode line bar 311. The first pixel electrode line 811 is connected to one end of the pixel electrodes 810 through the contact holes C6. The second pixel electrode line 812 is formed on the gate insulating film 400 and overlaps the second common electrode line bar 312. The second pixel electrode line 812 is connected to the other end of the pixel electrodes 810 through the contact holes C7.

Secondary common electrodes 320 are formed on the gate insulating film. The secondary common electrode 320 is divided into two portions located at opposite sides with respect to the data line 700. Each portion overlaps the edges of the data line 700 and the adjoining common electrode 310. Moreover, the secondary common electrode 320 is connected to the first and the second common electrode line bars 311 and 312 at left and right sides of the data line 700 through the contact holes C4, C5, C8, C9. That is, the secondary common electrode 320 electrically connects the common electrode line bars 311 and 312 of the adjacent pixels.

In the structure of the embodiment, a thin film transistor (TFT) is made by the gate electrode 200, the amorphous silicon layer 500, the doped amorphous silicon layers 610 and 620, and the source and the drain electrodes 710 and 720. The TFT transmits image signals from the data line 700 to the pixel electrode 810 according to scan signals from the connected gate line 200, 210, 220, 910 and 920.

In this embodiment, the secondary common electrode 320 generates an electric field blocking webbing that blocks the edges of the data line 700 to prevent the generation of an abnormal electric field due to the potential difference between the data line 700 and the pixel electrode 810. The electric field in this structure will be described hereinafter.

Figure 9:
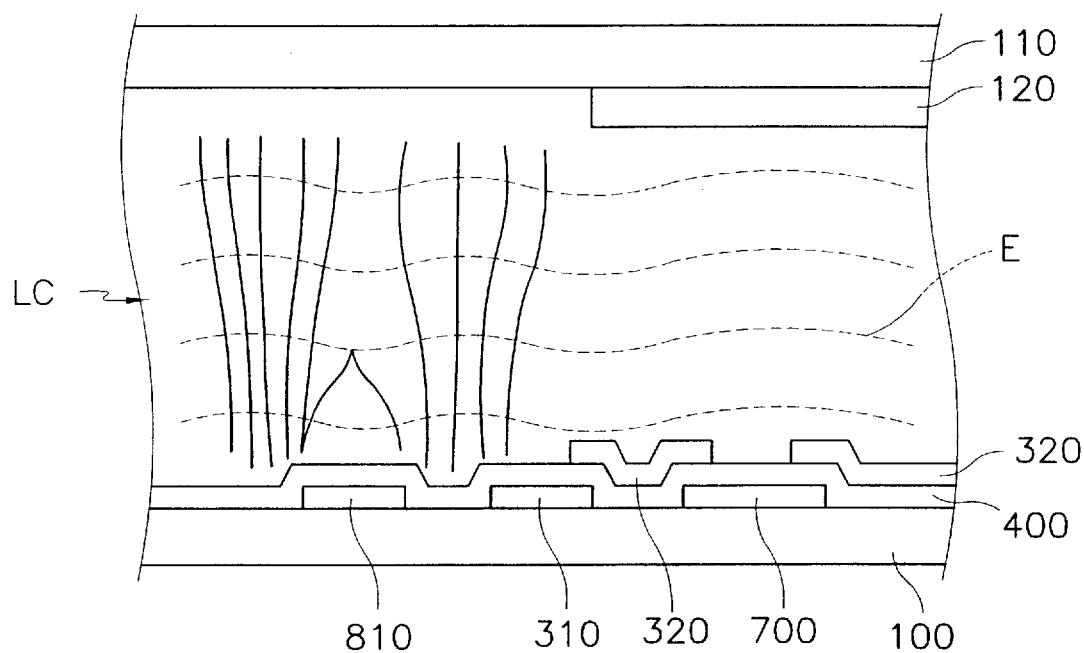
FIG. 9 is a cross-sectional view showing an electric field distribution and an arrangement of liquid crystal molecules in an LCD according to the first embodiment of the present invention.

FIG. 9 is a cross-sectional view showing an electric field distribution and an arrangement of liquid crystal molecules in an LCD according to the first embodiment of the present invention.

As the same in the conventional invention, since the pixel electrode 810, the common electrode 320 and the data line 700 are formed in one substrate 100 and arranged parallel to each other, the electric field E is generated parallel to the surfaces of the substrates 100 and 110. However, the secondary common electrode 320 is located between the common electrode 310 and the data line 700 and covers the edges of the data line 700. Therefore, the affects of signal voltage variations in the data line 700 on the electric field generated between the pixel electrode 810 and the common electrode 310 is decreased. As a result the abnormal arrangement of the liquid crystal molecules is reduced near the data line 700.

A manufacturing method of an LCD having the previously described structure and effects will be described with reference to FIG. 5 and FIGS. 10A to 10C hereinafter.

FIGS. 10A to 10E are cross-sectional views taken along lines VI-VI' and VII-VII' in FIG. 5 and show a method for manufacturing an LCD according to the first embodiment of the present invention.

Figure 10A:
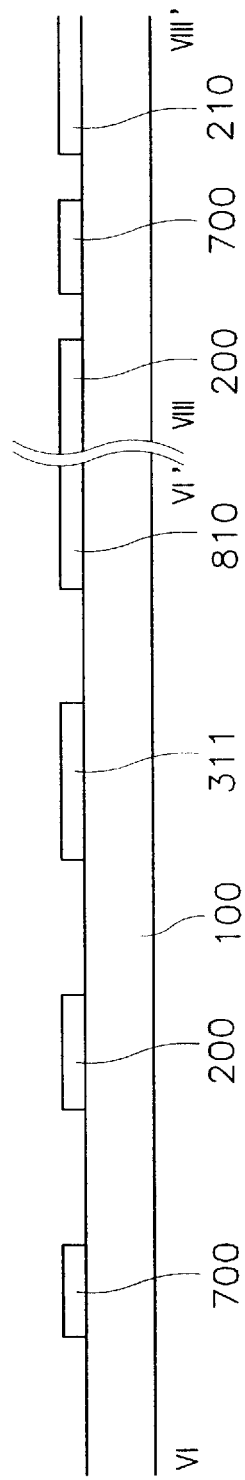
FIGS. 10A to 10E are cross-sectional views taken along lines VI-VI' and VII-VII', showing a method for manufacturing an LCD according to the first embodiment of the present invention.
Figure 10B:
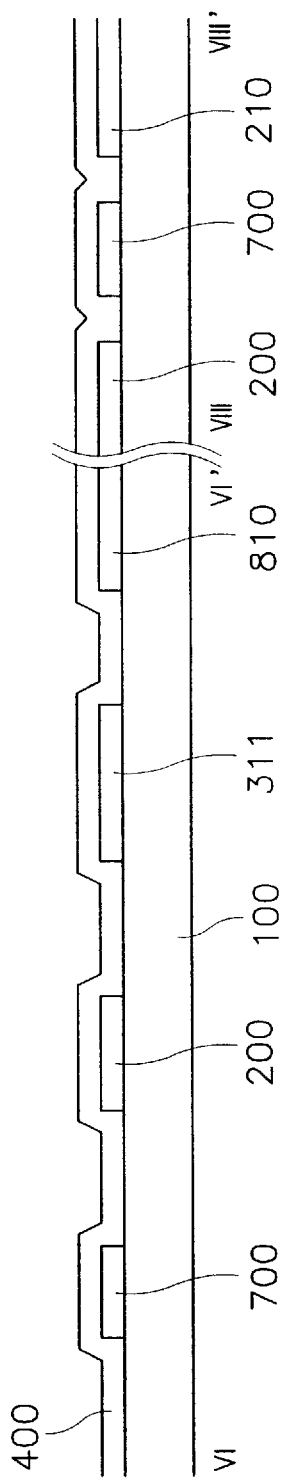

As shown in FIGS. 5 and 10A, the first conductive material layer is deposited on a substrate 100 and patterned to form the first conductive pattern which includes a gate electrode, a plurality of gate line bars 200, 210 and 220, a plurality of common electrode line bars 311 and 312, common electrodes 310, pixel electrodes 810 and data lines 700. Then, as shown in FIG. 10B, a gate insulating film 400 is deposited thereon.

Figure 10C:
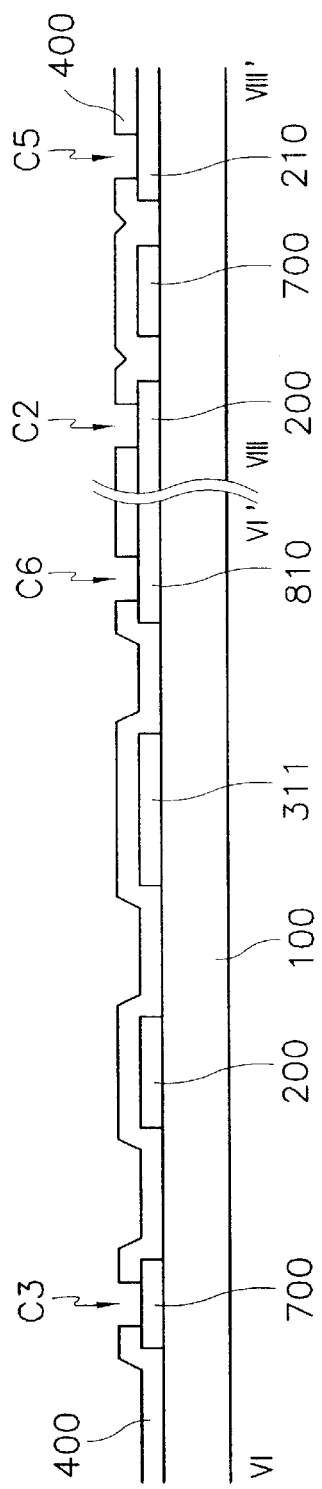

As shown in FIG. 5 and FIG. 10C, the gate insulating film 400 is etched to form contact holes C1, C2, C3, C6, C7, C4, C5, C8, C9 over the gate line bars 200, 210 and 220, the date line 700, the pixel electrode 810 and the common electrode line bars 311 and 312.

Figure 10D:
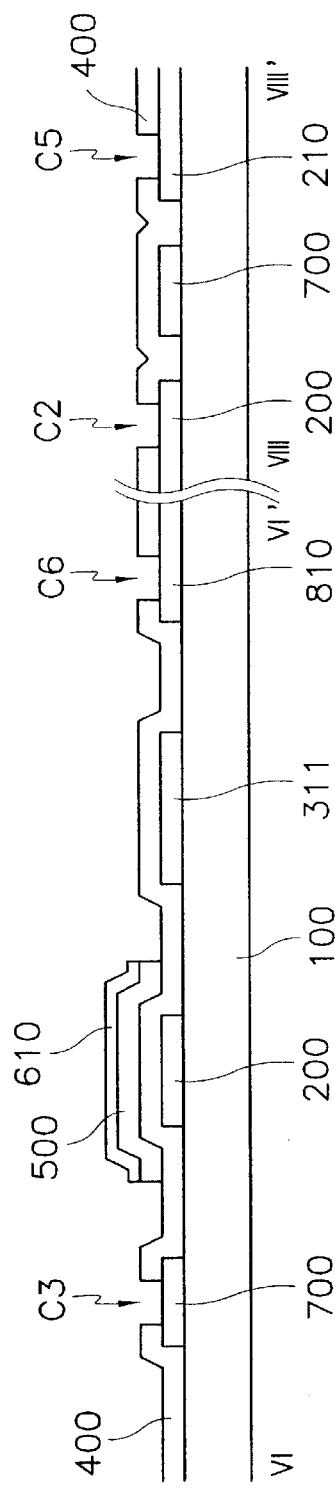

As shown in FIGS. 5 and 10D, a semiconductor layer including an amorphous silicon layer 500 as an active layer and a doped amorphous silicon layer 610 is formed on the gate insulating film 400 opposite the gate electrode 200.

Figure 10E:
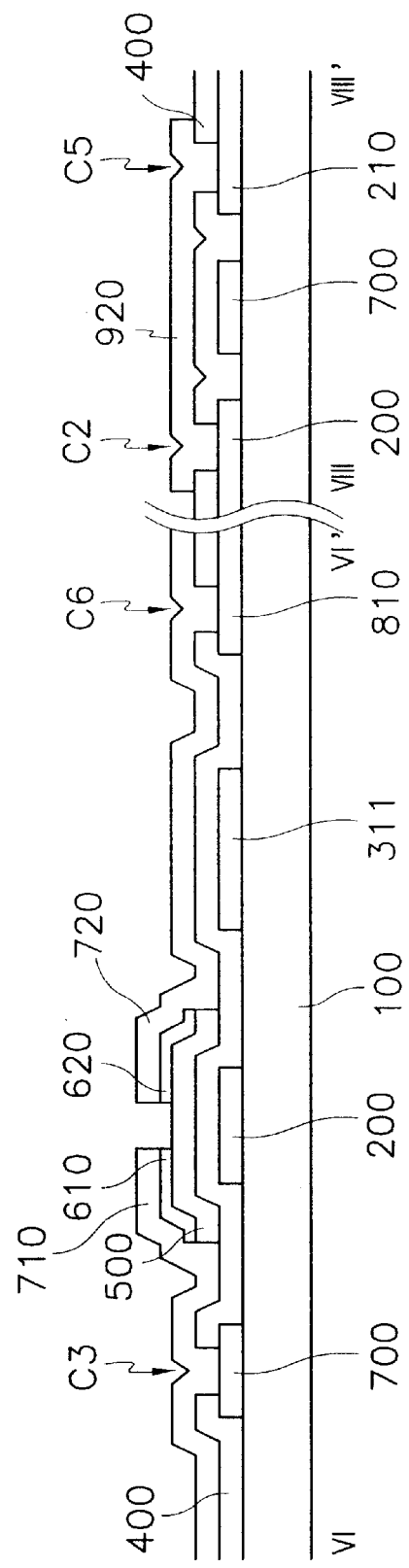

As shown in FIGS. 5 and 10E, the second conductive material layer is deposited and patterned to form the second conductive pattern which includes a source electrode 710, a drain electrode 720, connect patterns 910 and 920 connecting the gate line bars 200, 210, and 220 to each other, secondary common electrodes 320 and the first and the second pixel electrode lines 810 and 820. Then, the exposed doped amorphous silicon layer 610 is removed by using the second conductive pattern as a mask. In this step, the gate line bars 200, 210, and 220 which are separated from each other near the data lines 700 are electrically connected to each other by the connect patterns 910 and 920 through the contact holes C1 and C2. The source electrode 710 is connected to the data line 700 through the contact hole C3, the pixel electrode lines 811 and 812 are connected to the pixel electrode 810 through the contact holes C6 and C7. The common electrode line bars 311 and 312 which are located to left and right sides of the data line 700 are connected to each other via the secondary common electrodes 320, 321 and 322.

This embodiment was described in a bottom gate mode where the gate electrode 200 is located below the source and the drain electrodes 710 and 720. However, it is applicable to a top gate mode. Moreover, the electric field blocking film of this embodiment is not always required to be connected to the common electrodes if the film can block the electric field from the data line.

An LCD according to the second embodiment of the present invention now will be described hereinafter. The second embodiment is advantageous in reducing cross-talk and heat-generation.

Figure 11:
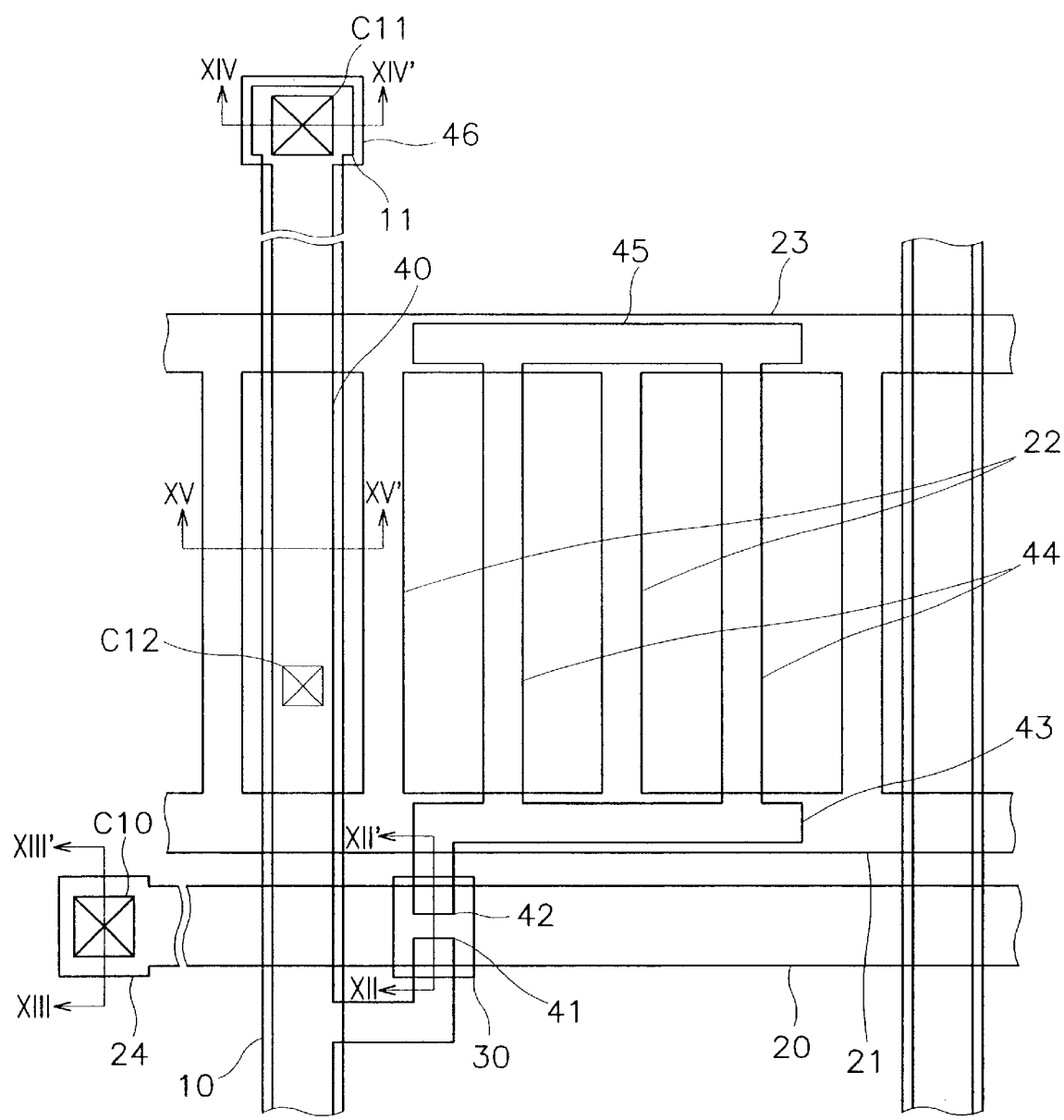
FIG. 11 is a layout view of an LCD according to the second embodiment.
Figure 12:
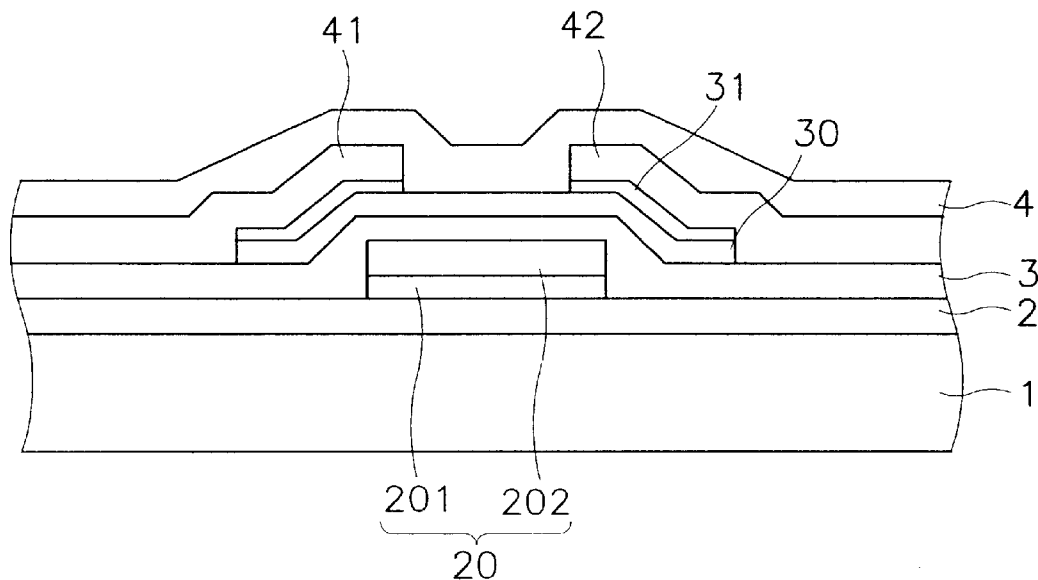
FIG. 12 is a cross sectional view of a thin film transistor taken along line XII-XII' in FIG. 11.
Figure 13:
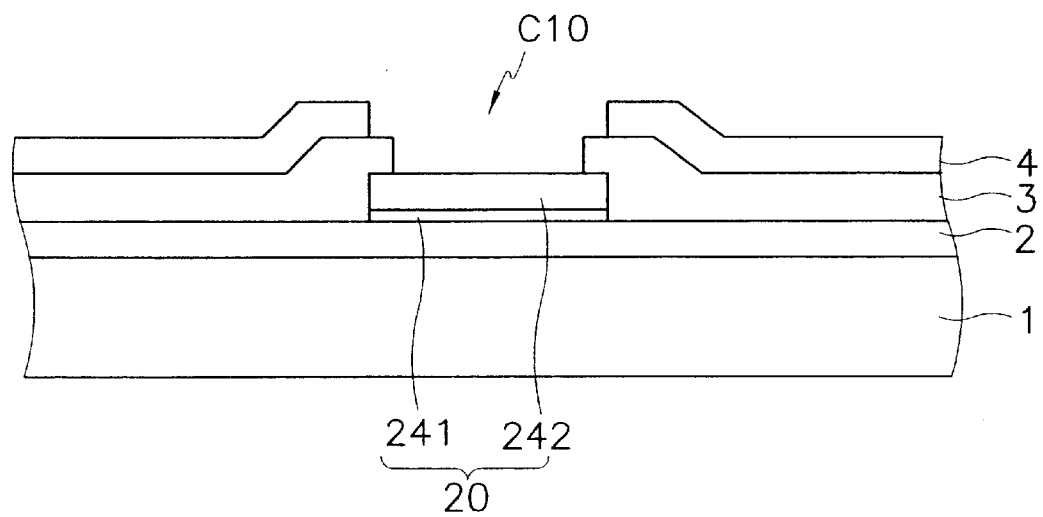
FIG. 13 is a cross-sectional view of a gate pad taken along line XIII-XIII' in FIG. 11.
Figure 14:
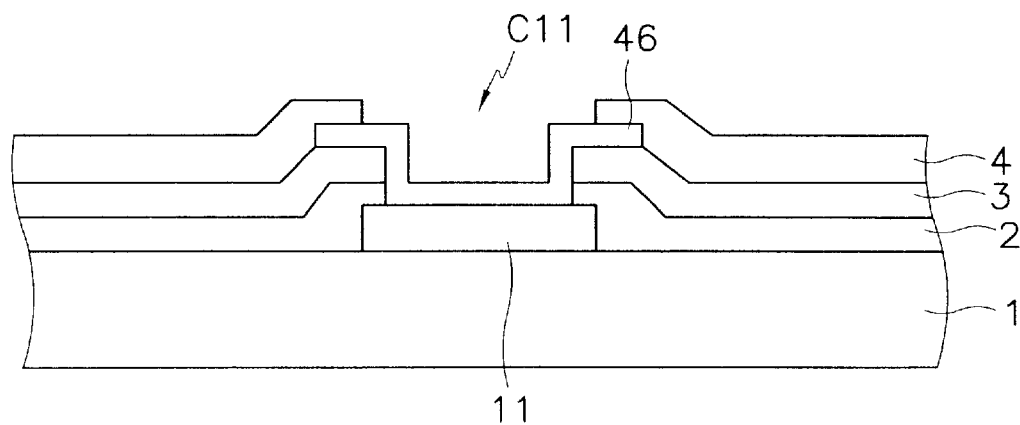
FIG. 14 is a cross-sectional view of a data pad taken along line XIV-XIV' in FIG. 11.
Figure 15:
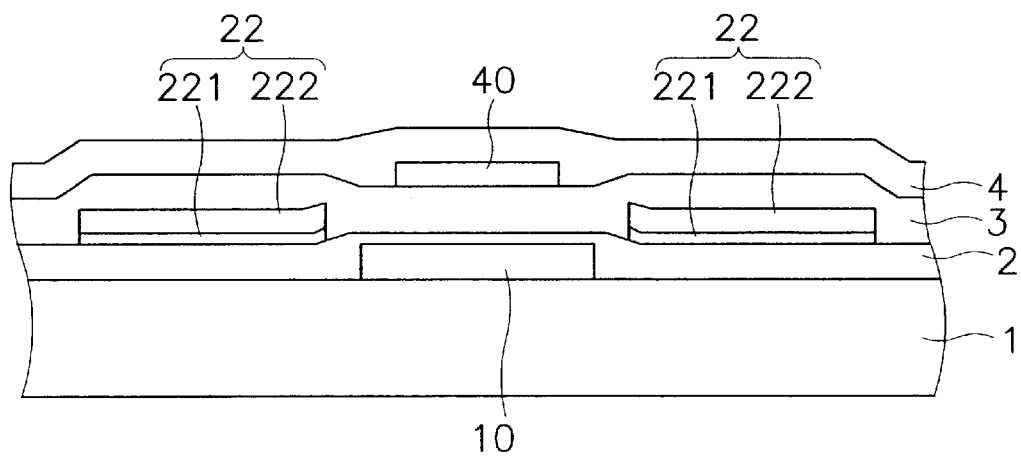
FIG. 15 is a cross-sectional view taken along line XV-XV' in FIG. 11.

FIG. 11 is a layout view of an LCD according to the second embodiment, FIG. 12 is a cross sectional view of a thin film transistor taken along line XII-XII' in FIG. 11, FIG. 13 is a cross-sectional view of a gate pad taken along line XIII-XIII' in FIG. 11, FIG. 14 is a cross-sectional view of a data pad taken along line XIV-XIV' in FIG. 11 and FIG. 15 is a cross-sectional view taken along line XV-XV' in FIG. 11.

As shown in FIGS. 11 and 15, the first data line 10 is formed in an insulating film 1, made of a low resistance metal such as AlNd, and the first data line 10 has a thickness of about 2,500 Å. A first data pad 11 to which image signals are applied is formed at the end of the first data line 10. A gate insulating film 2 covers the first data line 10 and the first data pad 11.

Gate lines 20 is formed on the gate insulating film 2 and is arranged in the horizontal direction in FIG. 11. The gate line 20 includes two layers 201 and 202 which are respectively made of Cr film and AlNd film. The first common electrode line 21 is formed on the same layer as the gate line 20 and arranged parallel to the gate line 20. A plurality of common electrodes 22 are extended from the first common electrode line 21 and are arranged in the vertical direction in FIG. 11. The second common electrode line 23 is formed parallel to the first common electrode line 21 and connects the ends of the common electrodes opposite the first common electrode line 21. A gate pad 24 to which scan signals are applied is formed to the end of the gate line 20.

A interlayer insulating film 3 covers a gate wire including the gate line 20 and the gate pad 24, and a common wire including the first and the second common electrode lines 21 and 23 and the common electrodes 22.

A semiconductor layer 30 made of an amorphous silicon is formed on the interlayer insulating film 3 opposite the gate line 20 and the second data line 40 is formed on the interlayer insulating film 3 opposite the first data line 10. The second data line 40 contacts the first data line 10 through a contact hole C12 formed in the interlayer insulating film to expose a portion of the first data line 10. The second data line 40 is made of Cr, and has a thickness of about 1,200 Å. The second data pad 46 is formed to the end of the second data line 40 and contacts the first data pad 11 through a contact hole C11 which is formed in the gate insulating film 2 and the interlayer insulating film 3 and exposes the first data pad 11.

A source electrode 41 is extended from the second data line 40 and overlaps one edge of the semiconductor layer 30. A drain electrode 42 overlaps another edge of the semiconductor layer 30 and is located opposite the source electrode 41. A contact layer 31 for improving contact characteristics is made of doped amorphous silicon and interposed between the semiconductor layer 30 and the source and the drain electrodes 41 and 42.

The first pixel electrode line 43 is extended from the drain electrode 42 and overlaps the first common electrode line 21. A plurality of pixel electrodes 44 are extended from the first pixel electrode line 43 and parallel to the common electrodes 22. The common electrodes 22 and the pixel electrodes 44 are alternately arranged. The ends of the pixel electrodes 44 are connected to the second pixel electrode line 45 which is formed opposite the first pixel electrode line 45 and overlaps the second common electrode line 23.

A passivation film 4 covers the second data line 40, the second data pad 46, the source and the drain electrodes 41 and 42, the first and the second pixel electrode lines 43 and 45, and the pixel electrodes 44. A contact hole C10 is made in the interlayer insulating film 3 and the passivation film 4 to expose the gate pad 24.

In the structure according to the second embodiment of the present invention, since the first data line 10 is located below the gate wire and the common wire, it is possible that light from a back-light device is effectively blocked without widening the light-blocking film or overlapping the common electrode 22 and the data wire.

The above-mentioned effect will be clarified by described with reference to FIG. 16.

Figure 16:
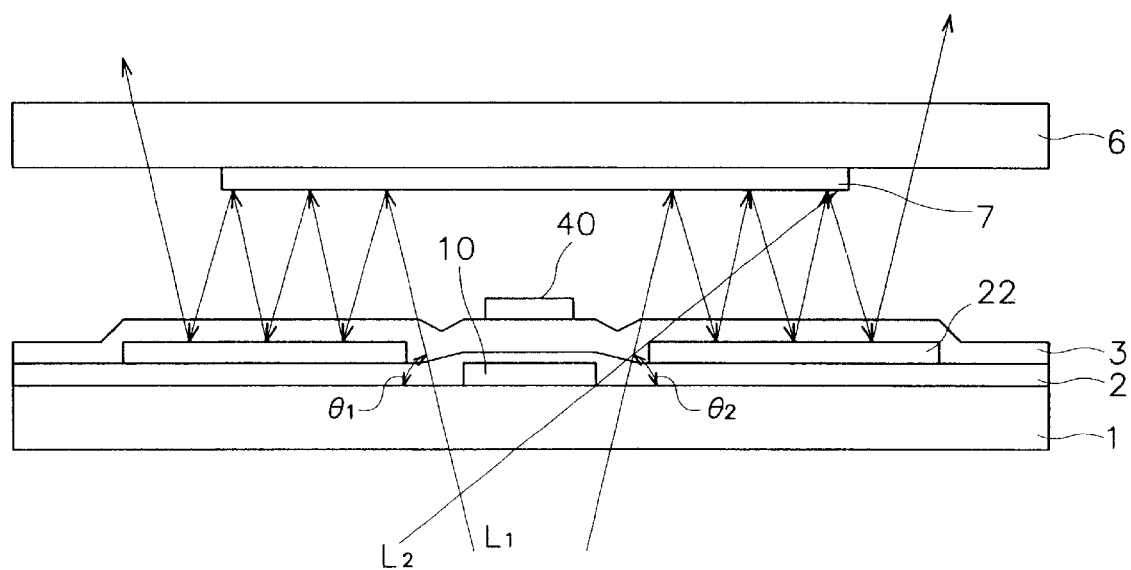
FIG. 16 is a cross-sectional view showing a mechanism for prevention light-leakage near the edges of pixels.

FIG. 16 is a cross-sectional view showing a mechanism for preventing light-leakage near the edges of pixels, in which a corresponding substrate having a light-blocking film faces a thin film transistor substrate.

As previously mentioned, the first data line 10 is formed on a substrate 1, and a gate insulating film 2 is formed thereon. A common wire including a plurality of common electrodes 22. As shown in FIG. 16, the common electrode 22 adjoining to the first data line 10 does not overlap the first data line 10, but is separated from it with prescribed gap. The second data line 40 is formed on a interlayer insulating film 3 covering the common electrodes 22 and overlaps the first data line 10. The second data line 40 does not overlap the common electrode 22, either.

Light from a back-light device is transmitted through the gap between the first data line 10 and the common electrode 22 and reflected on the light-blocking film 7 of the corresponding substrate 6. In this structure where the first data line 10 is formed below the common electrode 22, the incident angle ($\theta_1$) of the light ($L_1$) reaching the light-blocking film 7 is larger than incident angles associated with the conventional structure. Therefore, the incident light is reflected between the light-blocking film 7 and the common electrode 22 several times. Hence, when the light eventually reflects around the light-blocking film 7, the light is negligibly weak in intensity and a vertical cross-talk due to the light-leakage is reduced. Even when light ($L_2$) transmits through the space between the first data line 10 and the common electrode 22 with a minimum angle $\theta_2$, the light is mostly blocked by the light-blocking film 7 in this structure according to the second embodiment.

Moreover, since parasitic capacitance does not occur in the structure where the first data line 10 and the common electrode 22 do not overlap, driving circuits are not abnormally heated during operation.

As above described, in the LCD according to the first embodiment of the present invention and the manufacturing method thereof, the secondary electrode partially covers the data line and blocks the abnormal arrangement of the liquid crystal molecules near the data line. Therefore, cross-talk is reduced and image quality is improved.

Furthermore, in the LCD according to the second embodiment of the present invention, the main data line is located below the gate wire and the common electrode, and the data line and the common electrode do not overlap. Therefore, it is possible to prevent generation of heat in the driving circuits and vertical cross-talk. In addition, no additional equipment investment is required since it is possible to make the light-blocking film from metal films used in prior art.

In the drawings and specification, there have been disclosed typical preferred embodiments of the invention and, although specific terms are employed, they are used in a generic and descriptive sense only and not for purpose of limitation, the scope of the invention being set forth in the following claims.

What is claimed is:

1. A liquid crystal display, comprising:
    a first substrate;
    a first data line formed on the first substrate and arranged in a particular direction;
    a first insulating film covering the first data line;
    a gate line on the first insulating film and arranged in a perpendicular direction to the first data line;
    a common electrode line arranged parallel to the gate line;
    a plurality of common electrodes extended from the common electrode line and parallel to the first data line;
    a second substrate facing the first substrate;
    a light-blocking film formed on the second substrate and overlapping the first data line and the common electrode adjoining to the first data line;
    a second insulating film which covers the gate line and the common electrode; and
    a second data line which is formed on the second insulating film, overlaps the first data line and is electrically connected to the first data line.

2. A liquid crystal display according to claim 1, wherein the common electrode adjacent to the first data line does not overlap the first data line.

3. A liquid crystal display according to claim 1, wherein the second data line does not overlap the common electrode.

4. A liquid crystal display according to claim 1, further comprising:
    a semiconductor layer formed on the second insulating film opposite the gate line;
    a source electrode extending from the second data line and overlapping an edge of the semiconductor layer;
    a drain electrode located opposite the source electrode and overlapping another edge of the semiconductor layer;
    a pixel electrode line extending from the drain electrode and overlapping the common electrode line; and
    a plurality of pixel electrodes extending from the pixel electrode line, arranged parallel to the common electrode, each of which is located between the two pixel electrodes.

* * * * *